United States Patent [19]
Dimmer

[11] 3,767,861
[45] Oct. 23, 1973

[54] 3 TO 10 PORT CONFERENCE CIRCUIT

[75] Inventor: Robert P. Dimmer, Lombard, Ill.

[73] Assignee: GTE Automatic Electric Laboratories, Incorporated, Northlake, Ill.

[22] Filed: Aug. 31, 1972

[21] Appl. No.: 285,180

[52] U.S. Cl. .......... 179/1 CN, 179/170 G, 333/80 T
[51] Int. Cl. .......... H04m 3/40, H04m 3/56
[58] Field of Search .......... 179/1 CN, 170 G; 333/80 T

[56] References Cited

UNITED STATES PATENTS

| | | | |
|---|---|---|---|
| 3,636,266 | 1/1972 | Martin | 179/170 G |
| 3,236,948 | 2/1966 | DeMonte | 179/1 CN |
| 2,904,641 | 9/1959 | Radcliffe | 179/170 G |

*Primary Examiner*—William C. Cooper
*Assistant Examiner*—Douglas W. Olms
*Attorney*—K. Mullerheim et al.

[57] ABSTRACT

A conference circuit for multiple telephone subscribers including a plurality of input ports for connection to a common transmission line, means for selectively connecting each of the input ports to the transmission line, means for connecting an impedance associated with each of the input ports to the transmission line when the input port is disconnected from the transmission line and for disconnecting the impedance when the associated input port is connected to the transmission line, a shunt type negative impedance converter including a pair of operational amplifiers connected in a modified push-pull configuration to the transmission line, each amplifier having inverting and non-inverting input terminals and an output terminal, negative feedback means coupled from the output terminal to the inverting input terminal, and positive feedback means coupled from the output terminal to the non-inverting terminal, the positive feedback means including an impedance sufficient to prevent oscillation of the operational amplifier regardless of the number of input ports connected to the transmission line.

6 Claims, 1 Drawing Figure

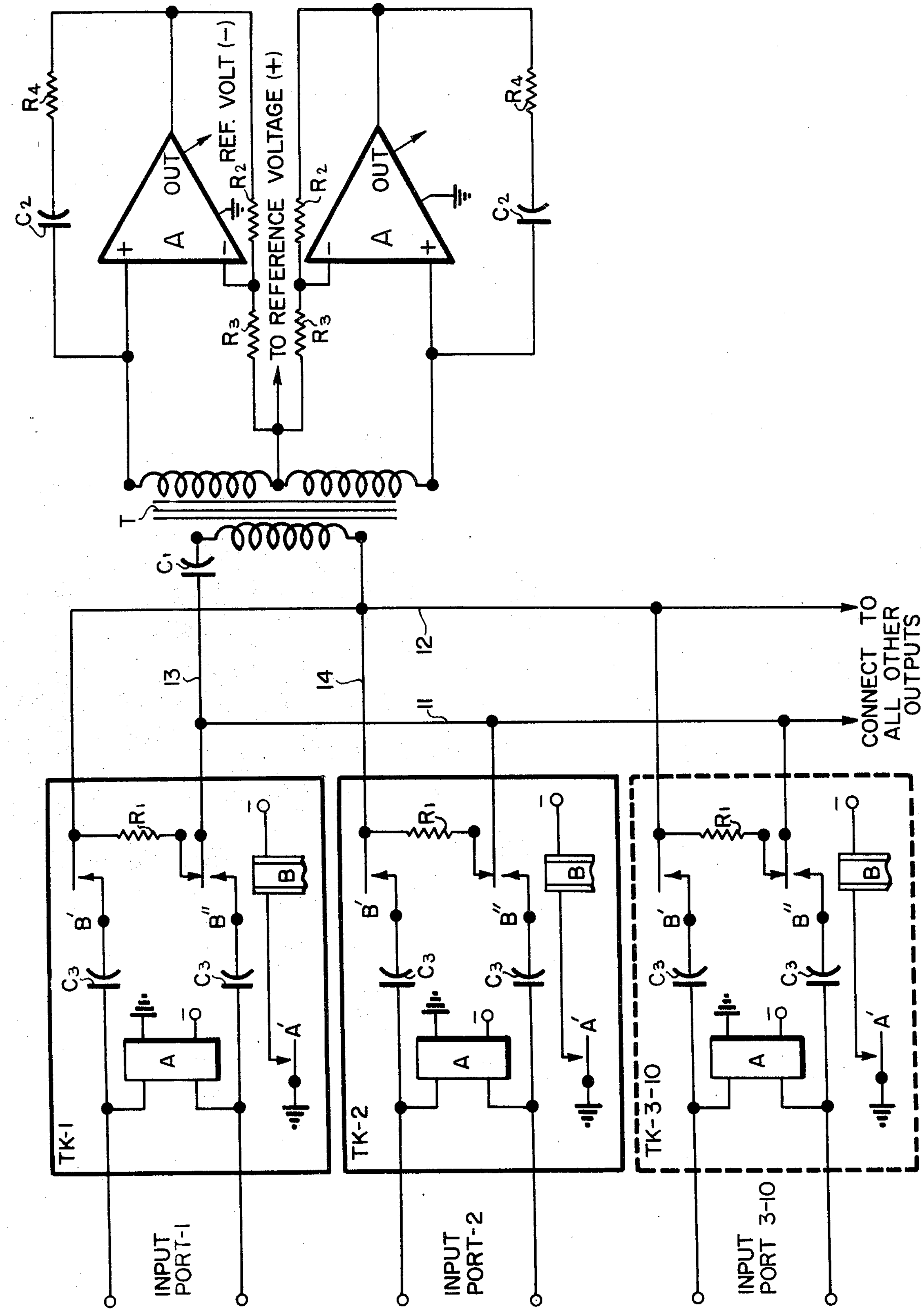
R4
C2
OUT
A
REF. VOLT (−)
R2
TO REFERENCE VOLTAGE (+)
R3
T
C1
12
13
14
11
CONNECT TO ALL OTHER OUTPUTS
R1
B′
B″
B
C3
A′
TK-1
TK-2
TK-3-10
INPUT PORT-1
INPUT PORT-2
INPUT PORT 3-10

3 TO 10 PORT CONFERENCE CIRCUIT

This invention relates to telephone conference circuits and more particularly to a novel repeater using a negative impedance converter for a telephone conference circuit which permits simultaneous communication among three to ten subscribers without any distortion or transmission bridging loss.

The prior art includes the following U.S. Pat. Nos: 3,236,948; 3,042,759; 3,573,647; and 2,963,558.

The design and operation of telephone conference circuits, i.e., circuits handling simultaneously three or more telephone subscriber lines, has in the past presented substantial difficulty. This difficulty is in part due to the fact that as each additional line is connected to the circuit, the parameters of the circuit including its impedance, vary over a wide range, resulting in operating difficulties such as variations in signal level and distortion. These problems have generally required the use of complex compensating equipment for proper operation of the conference circuit. Also affected by changes in the number of subscriber telephone lines which may be used at a given time are the repeaters used to provide gain in these circuits. A change in the number of subscriber telephone lines in use has generally required a corresponding change in the gain of the repeater in order to achieve a uniform signal in the conference circuit.

Briefly described, the present invention provides a repeater for a conference circuit with provision for a variable number of incoming ports, ranging from three to ten, which uses a shunt type negative impedance converter comprising a pair of operational amplifiers connected in a modified push-pull configuration. The repeater can handle up to 10 incoming lines for conference calls without distortion and without any transmission bridging loss as each incoming line is connected to the circuit. The operational amplifiers which are used in the circuit are simple and inexpensive and accordingly the complete repeater section can be made at very low cost.

The invention will be better understood from the following detailed description thereof, taken in conjunction with the accompanying drawing which shows schematically a typical circuit incorporating the repeater of the invention as used in a telephone conference circuit, and in which identical symbols are used to refer to like parts.

Referring to the figure, the trunk circuits or input ports TK-1, TK-2, etc. are identical. Although only three are shown, it should be understood that as many as ten similar circuits can be connected in parallel across the main bus conductors 11 and 12. When a call is placed from an input port, e.g., TK-1, to the conference circuit, the battery feed is obtained on a conventional manner through relay "A", which energizes relay "B", which in turn disconnects idle line termination resistor $R_1$ and instead connects input port TK-1 across the bus conductors 11 and 12.

Each of the input ports is provided with an idle line termination resistor $R_1$ which is selected to be equivalent to the impedance of the port circuit. When an input port is not in use, its idle line termination resistor is connected across the bus conductors 11 and 12. When a call comes through on a particular input port, its idle line termination resistor is disconnected from the common parallel bus, and is replaced by the trunk circuit. In this way it will be seen that the total impedance of all the trunk circuits connected to the common bus conductors 11 and 12 remains constant, regardless of whether an individual input port is in or out of the conference circuit at a given time.

For convenience, all of the input ports shown in the drawing are trunk circuits intended to be connected to a Strowger exchange. it should be understood, however, that any port, trunk, or junctor circuit which provides an idle line termination can also be used.

The repeater circuit connected to main bus conductors 11 and 12 through lines 13 and 14 is a shunt type negative impedance converter which is coupled through capacitor $C_1$ and transformer T, in which the primary/secondary turns ratio is 1/2 and in which the secondary winding is centertapped It will be seen that each half of the secondary winding is connected to a conventional operational amplifier A which is incorporated in a push-pull circuit. In each amplifier, negative feedback is provided through resistor $R_2$ from the output of the amplifier to its negative (inverting) input. Each inverting input is connected back to the secondary center-tapped reference point through resistor $R_3$. In typical operation, the voltage gain of each operational amplifier, represented by the ratio $R_2/R_3$ is on the order of 5.

In a variation from conventional amplifier operation each operational amplifier A has its output also connected back to the non-inverting (positive) input through resistor $R_4$ and capacitor $C_2$. Since there is no phase shift in this connection, oscillation will occur in the amplifiers if the positive feedback has sufficient energy. By suitably choosing the values of resistor $R_4$ and capacitor $C_2$ however, oscillation can be avoided.

The negative impedance converter used as a repeater in the present invention belongs to the class known as "short circuit stable" or "open circuit unstable". In other words, as the impedance of the input of the converter increases, the device approaches the oscillating point. In the present case, the total impedance in the input circuit is designed to be below the value which causes oscillation. Moreover, since each of the input ports is provided with an idle line termination ($R_1$) the total impedance in the input circuit to the converter remains constant regardless of whether any individual input port is in or out of service. Accordingly, the repeater remains stable in operation even though the number of ports in use may change.

As is well known, a negative impedance repeater does not provide "gain" in the conventional sense of an amplifier having an input and an output. Rather, such a repeater is a shunt two-terminal device which makes the impedance across which it is connected appear higher than if the repeater is not used. This result, in effect, increases the level of the signal in the circuit across which the repeater is connected.

The values of resistor $R_4$ and capacitor $C_2$ required for stable operation of the circuit will depend in part on the total number of input ports for which the circuit is designed, and in general as the total number of input ports increases, i.e., the total input impedance into the repeater decreases, the value of $R_4$ will decrease for a given value of $C_2$.

As an example of a typical embodiment of the invention for a repeater unit using $\mu$A741 operational amplifiers, the following values of resistors and capacitors can be used.

| | |
|---|---|
| $R_1$ | 900 ohms |
| $R_2$ | 5,000 ohms |
| $R_3$ | 1,000 ohms |
| $C_1$ | 4.0 mfd |
| $C_2$ | 0.25 mfd |
| $C_3$ | 4.0 mfd |
| $R_4$: | |
| 3 ports | 12,000 ohms |
| 4 ports | 6,000 ohms |
| 5 ports | 4,400 ohms |
| 10 ports | 2,000 ohms |

The "gain" adjustment circuits described above, consisting of $R_4$ and $C_2$, are intended for use in subscriber lines in which the impedance of the line is primarily resistive. In actual practice, these networks can contain additional reactance as necessary to compensate for loaded, non-loaded, or open wire lines which might be encountered in use. If longitudinal networks are used at the input of each port to control longitudinal noise problems, a network of similar type would be necessary in series with $R_4$ and $C_2$ in the repeater circuit.

The foregoing detailed description has been given for clearness of understanding only, and no unnecessary limi-tations should be understood therefrom, as modifications will be obvious to those skilled in the art.

What is claimed is:

1. A conference circuit for multiple telephone subscribers comprising:

a transmission line;

a plurality of input ports including means for connecting said input ports individually to said transmission line;

idle line termination impedance means associated with each of said input ports;

means for connecting each of said termination impedance means to said transmission line when its associated input port is disconnected from said transmission line, in-cluding means for disconnecting said impedance means when said associated input port is connected to said transmission line;

a negative impedance repeater operatively connected to said transmission line, said repeater comprising:

a pair of operational amplifiers push-pull coupled to said transmission line, each amplifier having inverting and non-inverting input terminals and an output terminal at which an output signal is produced relative to ground;

negative feedback means coupled from the output terminal of each amplifier to its inverting input terminal, said negative feedback means including a negative feedback resistor;

positive feedback means coupled from the output ter-minal of each amplifier to its non-inverting terminal, said positive feedback means including an impedance sufficient to prevent oscillation of said operational amplifier regardless of the number of input ports connected to said transmission line.

2. A conference circuit as claimed in claim 1, including a transformer having a primary winding and a center-tapped secondary winding with an associated center tap ter-minal and respective secondary winding terminals;

means for connecting said primary winding to said transmission line; and means for connecting said operational amplifiers to said center-tapped secondary winding.

3. A conference circuit as claimed in claim 2, including a respective coupling resistor for each of said operational amplifiers;

said coupling resistor interconnecting said center tap terminal to said negative feedback resistor at said in-verting input terminal; and means for connecting said respective secondary winding terminal to said positive feedback means at said non-inverting terminal.

4. A conference circuit as claimed in claim 3, wherein the ratio of said negative feedback resistor to said coupling resistor is on the order of five to one.

5. A conference circuit as claimed in claim 1, wherein said impedance includes a positive feedback resistor and capacitor serially connected between respective output and non-inverting terminals of said operational amplifier.

6. A conference circuit as claimed in claim 5, wherein said positive feedback resistor is of a predetermined value for an associated number of input ports connectable to said transmission line, said value being inversely related to a greater or lesser number of input ports connectable to said transmission line.

* * * * *